March 8, 1927.
J. WENZ ET AL
1,619,837
SOLDERING ART
Filed April 8, 1925
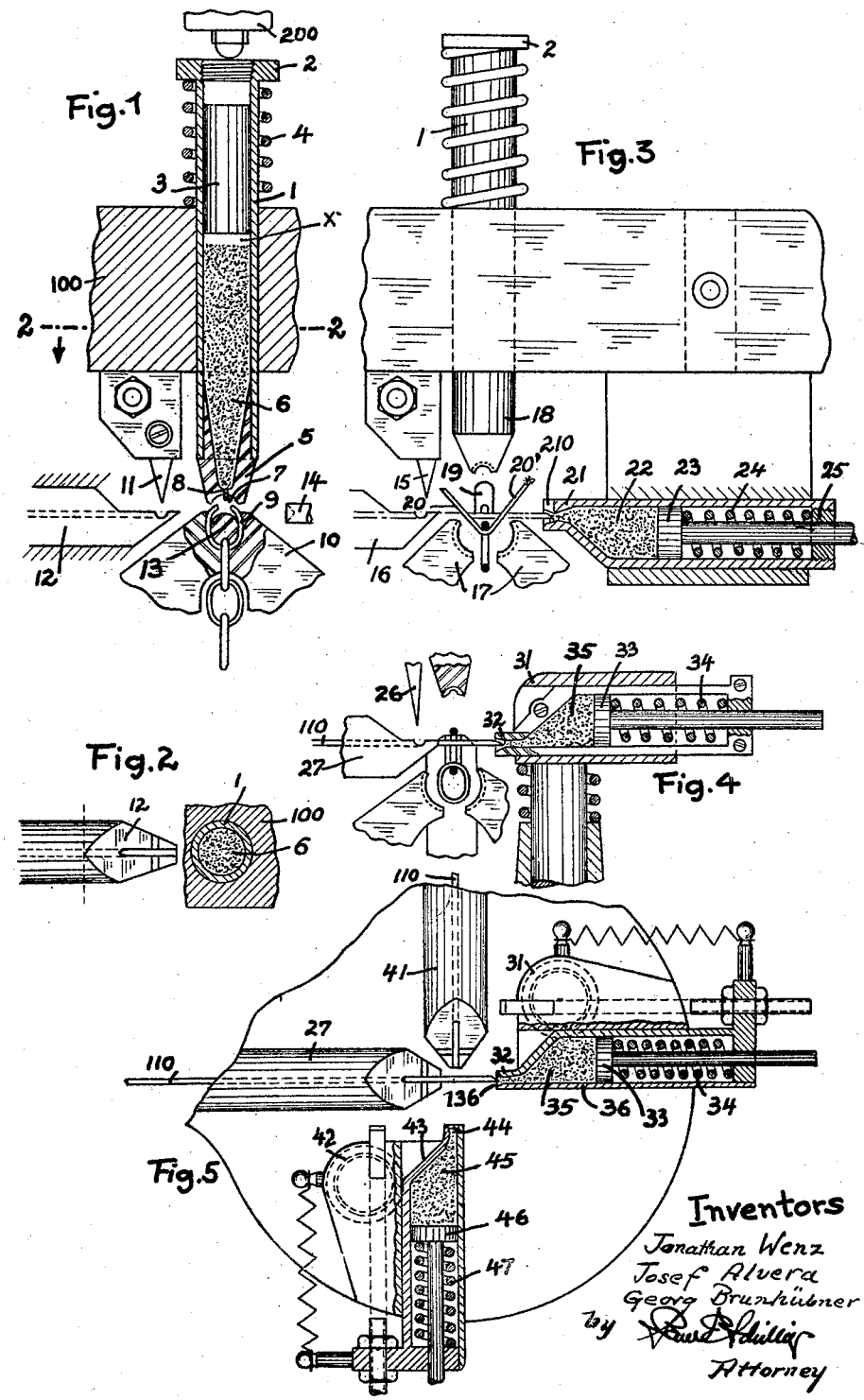
Inventors
Jonathan Wenz
Josef Alvera
Georg Brunhübner
by
Attorney Patented Mar. 8, 1927.

1,619,837

UNITED STATES PATENT OFFICE.

JONATHAN WENZ, JOSEF ALVERA, AND GEORG BRUNHÜBNER, OF PFORZHEIM, GERMANY.

SOLDERING ART.

Application filed April 8, 1925, Serial No. 21,513, and in Germany December 2, 1924.

The present invention has reference to improvements in the art of soldering and relates more particularly to an improved method and apparatus for expeditiously simultaneously forming the individual links of chains, mesh fabric, and the like, and closingly soldering their abutting end faces, the invention including means for positively feeding and apportioningly presenting the soldering agent to the link joint in the form of tears or other small measured amounts in timed relation to the link closing operation.

In order to make our invention readily understood we will now describe it in connection with the accompanying drawing, in which Fig. 1 is a vertical section through the new combination link closing and soldering device, with a solder tear about to be dropped between the nearly closed end faces of the chain link blank. Fig. 2 is a horizontal section through Fig. 1 on line 2—2. Fig. 3 is a side view of a modification, partly in section. Fig. 4 is a vertical section through a modification using two sets of link-forming tools, of which Fig. 5 is a horizontal section.

Referring first to Fig. 1, the reference numeral 100 denotes a fixed machine frame part within which is reciprocably mounted the hollow link-closing stamp 1, a helical spring 4 tending to always urge the stamp into its uppermost relative position. The stamp 1 is designed to serve as container for the viscous solder agent 6 and is periodically depressed by a suitably operated member 200, acting on the screw top end 2 of the stamp, with a jerky movement to cause a hammer weight 3, freely resting on the mass of solder within the stamp, to correspondingly jump and drop and thereby hammer the solder in timed relation to the link closing movements of the stamp, whereby at each hammer blow a small quantity 7 of solder is forced out of the bottom passage 8 through the recessed stamp head 5, as clearly shown in Fig. 1. Just prior to the stamp reaching its lowermost position this solder tear is deposited between the opposed, still open end faces of the chain link 9, whereupon the link is immediately closed tight during the end movement of the stamp. During this link closing movement of the stamp the hammer weight 3 owing to its inertia, lags somewhat behind the mass of solder (as indicated in Fig. 1 by the white zone $x$). The expression of the solder, thus, takes place only during the return, that is to say upward movement of the stamp, whilst during the down movement of the latter the hammer weight is momentarily lifted off the solder, so that no further solder is expressed. Solder feed thus occurs only at predetermined periods of the work cycle and the amount of solder thus expressed can readily be controlled by properly dimensioning the discharge passage 8.

The U-formation of the link, as is well known in the art, is caused by the shaping tongs 10 and the bender 13, after the length of wire stock fed through the wire feeder 12 is cut off by the knife 11, the stop 14 serving to prevent the wire blank from being fed too far or becoming deflected.

In the modification according to Fig. 3 the wire stop 21 is designed to serve as container and feeder for the solder 22. After the wire 20 has been advanced over the tongs 17 by the wire feeder 16 so as to extend with its forward end slightly into the recessed discharge snout 210 of the solder container it is cut off by the beveled knife 15 and is then shaped by the bender 19 within the jaws of the tongs 17. On being folded upwardly the link leg 20′ will scoop up on its bevel face a small amount of solder, as clearly shown in this figure, which solder on the ensuing link closing movement will be clamped between the link end faces and will then "shut" the link. The solder in this instance is fed into the snout 210 by the piston 23 controlled by the helical spring 24 interposed between the piston and the screw plug 25, which latter serves to guide the piston stem and allows of convenient refilling of the container 21 with the solder.

The stamp 18 in this embodiment may be hollow or solid but it is not designed to house and feed solder as in the first above described construction.

Figs. 4 and 5 show still another constructional modification in which the solder 35 and 45 is fed to the link ends through the hollow tools 36 and 44 respectively, and in which two wire feeds, two knives and two clamping and shaping tongs are used. The knife 26 cooperating with the left wire feeder 27 separates the wire stock 110. The other knife for the wire feed 41 has been omitted for the sake of clarity. In this construction it is the wire stops which are designed to serve as solder container and feeder. As shown, the wire feeds 27 and 41 are arranged oppositely to the link bending tools 31, 32 and 42, 43 respectively. The reciprocating members 32 and 43 are hollow and contain the soldering material 35 and 45 respectively. The expulsion of the solder is effected by the pistons 33 and 46 which are influenced by the pressure springs 34 and 47 respectively. The members 32 and 43 present finely apertured snouts 136 and 44 respectively for the timed discharge of a predeterminable amount of solder. The pistons 33 and 46 are periodically actuated in any suitable manner, for instance by cam means, to expel relatively small amounts of solder through the snouts of the members 32 and 43 respectively, the beveled edge of the wire blank in its upward closing movement scooping up the amount of solder required for a clean, smooth joint without waste.

From the above description it appears that the wire stock may be fed to the bending and soldering zone in any suitable manner, our invention residing solely in the manner of controllably feeding the solder to the link joint by means of or through a conventional machine member used in the formation of the link. We may, for instance, also use the bending tool 19 (shown in Fig. 3) for the purpose of feeding the solder to the joint from below, or we may use the wire severing tool as solder feed, by making the knife and its support hollow to hold the solder, and provide a small lateral passage through the lower end of the knife for the discharge of the solder therethrough.

The solder expressing member, such as the hammer weight 3, and the pistons 23, 33 and 46 respectively, may also be positively actuated by a screw drive with the same effect. Again, it is not necessary to store the solder within a link working tool, since the same effect can be obtained by providing a separate container for the solder; in which latter instance it requires only a conduit for conducting the solder from this container to very close to the soldering zone, the respective tool or the wire blank wipingly passing the discharge opening of this solder conduit to take along sufficient solder, or the discharge opening of this conduit is suitably moved past the tool in case the latter is stationary. This arrangement has the advantage that it is possible to use the operative stroke of the respective link forming machine part to alternately occlude and open the solder discharge opening, so that the solder issues in timed relation to the link forming and closing steps.

What we claim is:—

1. In a link forming machine, a link closing stamp having a solder containing chamber and a link closing recess with which latter the said chamber has communication through a solder conducting passage, and jar-operated means for positively feeding the solder through said passage.

2. In a link forming machine, a link closing stamp having a solder containing chamber and a link closing recess with which latter said chamber has communication through a solder conducting passage, and jar-operated means for positively feeding the solder through said passage comprising a hammer-weight freely movable within said chamber back of the chamber content.

3. In a link closing machine, in combination with the conventional link forming mechanisms, means for supplying solder to the link joint in controllable amount and timed relation to the operation of the link forming mechanisms, comprising a reciprocable container having a discharge opening, viscous solder in said container, and relatively independent means within said container normally inactively resting on the solder but adapted to expressingly act on it on the upstroke of said container and to be laggingly lifted thereoff by its inertia on the downstroke of the container.

4. In a link closing machine, in combination with the conventional link forming mechanisms, means for supplying soft solder to the link joint in controllable amounts and in timed relation to the operation of the link forming mechanisms, comprising a solder container having a discharge opening, and jar-actuated means acting on the solder within the container, for intermittently forcing out solder through said discharge opening.

JONATHAN WENZ.
GEORG BRUNHÜBNER.
JOSEF ALVERA.